United States Patent
Geurts

(10) Patent No.: US 7,707,033 B2
(45) Date of Patent: Apr. 27, 2010

(54) METHOD FOR TRAINING A CONSUMER-ORIENTED APPLICATION DEVICE BY SPEECH ITEMS, WHILST REPORTING PROGRESS BY AN ANIMATED CHARACTER WITH VARIOUS MATURITY STATUSES EACH ASSOCIATED TO A RESPECTIVE TRAINING LEVEL, AND A DEVICE ARRANGED FOR SUPPORTING SUCH METHOD

(75) Inventor: Lucas Jacobus Franciscus Geurts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1891 days.

(21) Appl. No.: 10/480,353

(22) PCT Filed: Jun. 18, 2002

(86) PCT No.: PCT/IB02/02386

§ 371 (c)(1),
(2), (4) Date: Dec. 10, 2003

(87) PCT Pub. No.: WO03/001506

PCT Pub. Date: Jan. 3, 2003

(65) Prior Publication Data

US 2004/0167782 A1    Aug. 26, 2004

(30) Foreign Application Priority Data

Jun. 21, 2001  (EP)  ................................ 01202402

(51) Int. Cl.
*G10L 15/06*    (2006.01)

(52) U.S. Cl. ...................... 704/241; 704/231; 704/275; 715/728

(58) Field of Classification Search .................. 706/48; 715/706, 727, 728, 859, 861
See application file for complete search history.

(56) References Cited

U.S. PATENT DOCUMENTS

| | | | | |
|---|---|---|---|---|
| 5,689,618 A * | 11/1997 | Gasper et al. | ................ | 704/276 |
| 5,893,064 A * | 4/1999 | Kudirka et al. | ............ | 704/270.1 |
| 5,933,806 A * | 8/1999 | Beyerlein et al. | ......... | 704/256.8 |
| 5,966,526 A * | 10/1999 | Yokoi | ........................... | 703/11 |
| 6,075,534 A * | 6/2000 | VanBuskirk et al. | ......... | 715/835 |
| 6,088,669 A * | 7/2000 | Maes | ........................... | 704/231 |
| 6,122,614 A * | 9/2000 | Kahn et al. | ................... | 704/235 |
| 6,213,872 B1 * | 4/2001 | Harada et al. | ................... | 463/7 |
| 6,328,569 B1 * | 12/2001 | Jenkins et al. | ............... | 434/169 |
| 6,687,604 B2 * | 2/2004 | Kato | ............................ | 701/200 |
| 7,092,884 B2 * | 8/2006 | Lewis et al. | .................. | 704/243 |
| 2002/0094851 A1 * | 7/2002 | Rheey | ............................. | 463/1 |
| 2002/0098879 A1 * | 7/2002 | Rheey | ............................. | 463/1 |
| 2002/0133592 A1 * | 9/2002 | Matsuda et al. | .............. | 709/225 |
| 2004/0220812 A1 * | 11/2004 | Bellomo et al. | .............. | 704/275 |

FOREIGN PATENT DOCUMENTS

EP    1028410    8/2000

* cited by examiner

*Primary Examiner*—David R Vincent
*Assistant Examiner*—D H Kim

(57) ABSTRACT

Training a consumer-oriented application device is based on a plurality of user-presented speech items. A progress measure is reported regarding a training status reached for a particular user person. In particular, the training status is visually represented by an animated character creature which has a plurality of training status representative maturity statuses that are each associated to a corresponding training level.

20 Claims, 4 Drawing Sheets 210  220  FIG. 5f

METHOD FOR TRAINING A CONSUMER-ORIENTED APPLICATION DEVICE BY SPEECH ITEMS, WHILST REPORTING PROGRESS BY AN ANIMATED CHARACTER WITH VARIOUS MATURITY STATUSES EACH ASSOCIATED TO A RESPECTIVE TRAINING LEVEL, AND A DEVICE ARRANGED FOR SUPPORTING SUCH METHOD

This application is the U.S. National Stage of International Application No. PCT/IB2002/02386, filed Jun. 18, 2002, which claims foreign priority from EP Application (EPO) 01202402.2, filed Jun. 21, 2001.

BACKGROUND OF THE INVENTION

The invention relates to a method for training a consumer-oriented application device. Such voice-controlled application devices are becoming more and more abundant, such as in the form of Audio sets, Television sets, Settop boxes, and the like. The present invention addresses the feature of having user-dependent speech recognition in such devices, which necessitates a certain amount of training for a particular user. In contradistinction, user-independent recognition will usually come fully trained. However, combining a user independent trained device with the teachings of the present invention to be disclosed herinafter, will improve the functioning of such system as well. Now, a typical state-of-the-art is represented by U.S. 6,324,507 assigned to IBM Corporation. The reference uses colors to highlight certain displayed text items during the training. The present inventor has recognized however that such training operation would benefit from presenting a comprehensive feedback to a user to indicate a general or overall status of the training level attained. In particular, the inventor has recognized that a maturity status of the animated character could immediately be recognized as broadly representing the training level attained.

SUMMARY TO THE INVENTION

In consequence, amongst other things, it is an object of the invention to present feedback to a user in the form of a comprehensive animated character creature that features a plurality of maturity statuses.

The invention also relates to a consumer-oriented application device being arranged for implementing a method for training a consumer-oriented application device.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIGS. 5a-5f, visual representations of expressions on a dog's head;

GENERAL ASPECTS OF THE INVENTION

The disclosure describes the presenting of the training status of a voice-controlled system to a user person in an intuitive manner. Typically in a speaker-dependent system a plurality of words or phrases must be trained by its user before a complete functionality will be attained, such as one that allows zapping through a plurality of channels, the correct programming and setting of such channels, and the like. In contradistinction, in a speaker-independent system the training is basically already present. However, enhancing such by the present invention will error margin and/or even broaden the recognition set of commands and/or phrases. The inventor has recognized that already a partial functionality will be sufficient, such as for less demanding users, for use during an initial period, and for various other such cases.

Another situation is where partial training relates to the number of people, such as members of a household, that will have been trained. The training level corresponds to the number or fraction of such level. In particular, the user should still be made aware that the training is not yet complete. The embodiment hereinafter assumes that the voice control functionality is presented by an animated character such as a dog, that from the user's point of view will interpret commands given, and translate them into system commands. The embodiment uses the metaphor of a maturity status of a growing creature to communicate the training status of the system. In particular, a young puppy will represent a system that has had no training yet. For the user person in question, it has been shown to be more acceptable that in such situation the system will not listen to voice commands that have not yet been trained sufficiently. A plurality of training levels may be defined, each of which is related to an associated number of trained words. The levels are linked to the "maturity status" of the creature. If the user trains new words, the creature will grow up. Each level may contain a plurality of animation sequences that are used to present specific feedback on the effectiveness of specific voice commands, such as a word that is recognized.

DETAILED DESCRIPTION OF PREFERRED EMBODIMENTS

Figure 1:
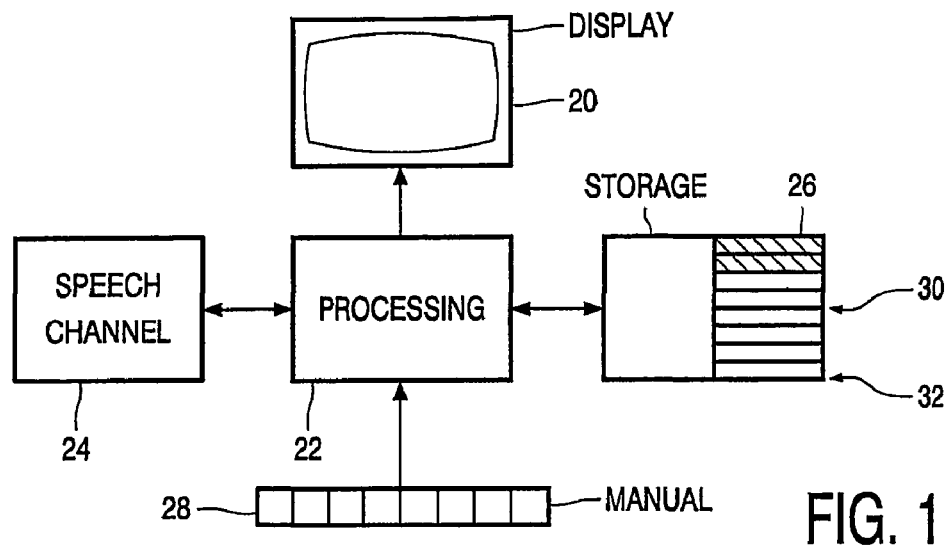
FIG. 1, a general speech-enhanced application device.

FIG. 1 illustrates a general speech-enhanced application device, that is centered around a television display 20 and associated processing 22. However, the invention is also applicable to a display that features less than a full television image. In particular, the display may be limited to the showing of icons, possibly in conjunction with alpha-numerical characters. For brevity, the processing of the user signals, such a by recording, tuning and the like, have been omitted. Also, the various user-controlled selecting among user modes and other functionalities has been omitted. Item 24 represents a speech channel that may be bidirectional, although it may be restricted to only the reception and recognition of speech items. Speech output is useful but not a prerequisite. Item 26 represents the storage of user speech items that through an appropriate recognition process should each be associated to the correct system command. For simplicity, only eight of such items have been shown. Generally, the number will be higher, and can comprise certain words (such as television, on, louder), phrases (such as go back, picture-in-picture), and parameters, such as the number of a particular channel.

During training, the appliance will go through a sequence of commands, each of which should be voiced by the user person and stored a certain number of times, such as three times. Inasmuch as the overall number of recordings can be quite high, the user person may prefer to divide the training over a plurality of sessions. Through a judicious assigning of an appropriate position in the sequence to the various commands, the correct recording of a certain subset thereof will often already cater to the most frequent user requests or partial functionalities of the appliance. In the example, two commands have been trained as indicated by hatching, full training requires eight commands as indicated by arrow 32, and four commands would already represent a workable intermediate situation as indicated by arrow 30. In another setup, the number of trained speech items will represent the various training statuses, without it mattering which speech items had been trained.

Item 28 represents a manual control functionality. In certain cases the voice control feature has been developed to such an extent that any manual control need be rudimentary only. The system may be extended by various numbers of user functionality devices such as audio, settop boxes, input devices, recording, storage aspects, communication, which however are not a prerequisite for disclosing the principles and operations of the invention.

Figure 2:
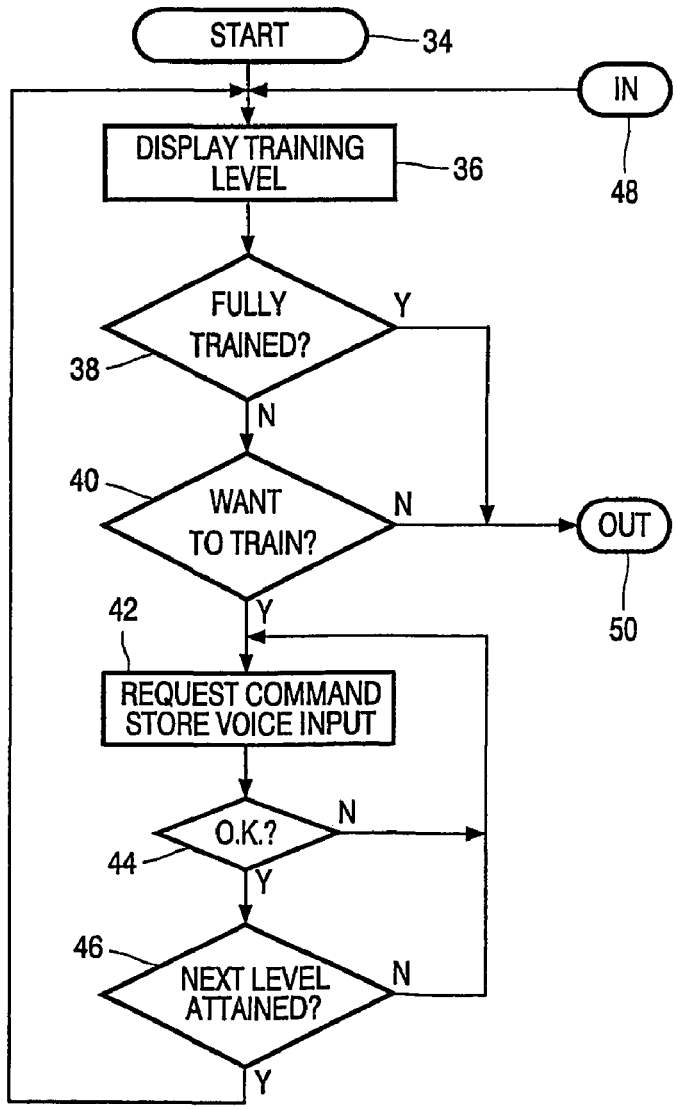
FIG. 2, a flow chart associated to the training according to the present invention.

FIG. 2 illustrates a flow chart associated to the training according to the present invention. In block 34, the system is activated, such as by the powering on of the appliance, and the necessary hardware and software facilities are assigned. In block 36, the actual training level is displayed, which will be discussed more in detail hereinafter with reference to FIGS. 4 through 5f. Initially, no training will have been done, of course. The training may be effected by a particular person, who may be signaled by entering of a code, or by voice recognition, as distinct from speech recognition. In block 38, the system detects whether training has been completed already. If yes, the systems goes to FIG. 3 by way of block 50.

If the training is still incomplete, in block 40 the system detects whether the user wants to proceed with training. If no training has been done at all for the user in question, this block is of course a dummy. If no training is wanted, the system outs through block 50. In block 42, the user should train the system to the next command in sequence. In the situation of FIG. 1, this would, for example, be the third speech item, because the first two have been trained correctly. Therefore, the user will now enter the command in question, such as by reading aloud a displayed text, by repeating a speech item from the system, or by another procedure. For each command, this may be repeated a few times, such as three times, which has been understood to be contained within a single traverse through block 42. In block 44, the system checks for faults, such as for the case of non-conforming command, for a delay that is too long, and the like. If at fault, the system begins again with the same command. By itself, such training procedures have become commonplace, so reference is had to the general state of the art.

If the command has been trained sufficiently, as found in block 44, in block 46 the system checks whether the next training level has been attained. If no, the next command is taken up for training in block 42. If yes, the system goes to block 36 for updating the overall display status of the training level.

Figure 3:
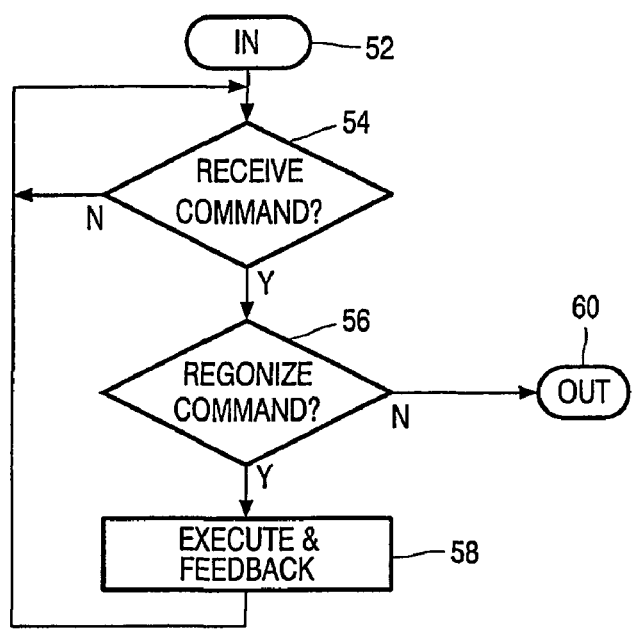
FIG. 3, a flow chart associated to the device control for to the present invention.

FIG. 3 illustrates a flow chart associated to the device control for to the present invention. In block 52 the entry from block 50 in FIG. 2 is represented. In block 54, the system detects reception of a voiced user command. If no, block 54 effectively constitutes a waiting loop. If yes, in block 56 an appropriate recognition is checked. If yes, in block 58 the command is executed, and if appropriate, feedback is given to the user, such as by displaying a relevant reaction by the animated character creature from block 36. Furthermore, the system goes back to block 54. If negative in block 56, the system may first ask for a repeat by the user. However, if this remains inconclusive, various situations may exist. A first one is that the training for the user in question is deficient, for example in that the user's voice may have changed. Another case would be that the training level for the particular user was incompatible with the command actually given. In that case, the system outs by way of block 60, and enters the flow chart of FIG. 2 by way of block 48.

Figures 4A, 4B, 4C, 4D:
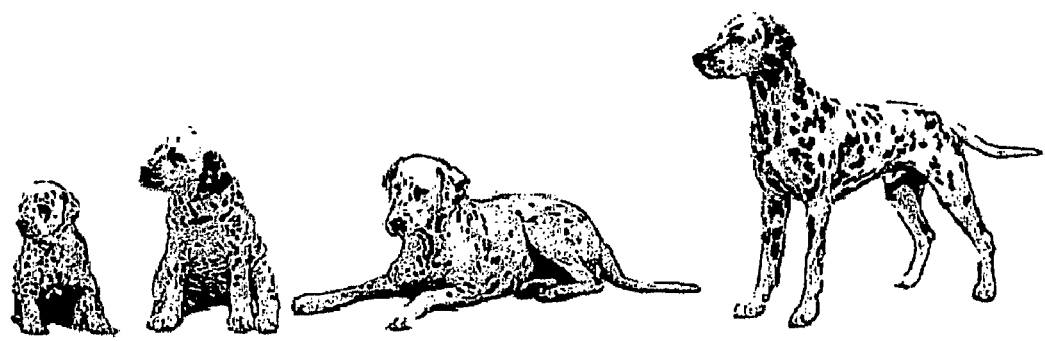
FIGS. 4a-4d, visual representation embodiments of the character in the form of a dog.

FIGS. 4a-4d illustrates visual representation embodiments of the character in the form of a dog. In FIG. 4a, the dog is still a puppy to signify that training has only attained some skeleton of the overall set of commands. In FIG. 4b, the dog is somewhat older already, such as a few months, to signify that training has attained a higher level that may be workable for certain basic functions, but that is still insufficient for a sophisticated control of the apparatus. In FIG. 4c, the dog is again older, such as nearly a year, to signify that training has attained a still higher level, so that most common functions can be recognized. In FIG. 4d, the dog is still older, to signify that all or nearly all functions can be recognized.

Figure 5A:
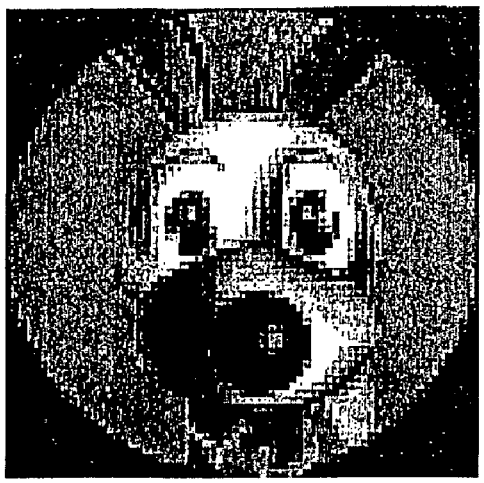
Figure 5B:
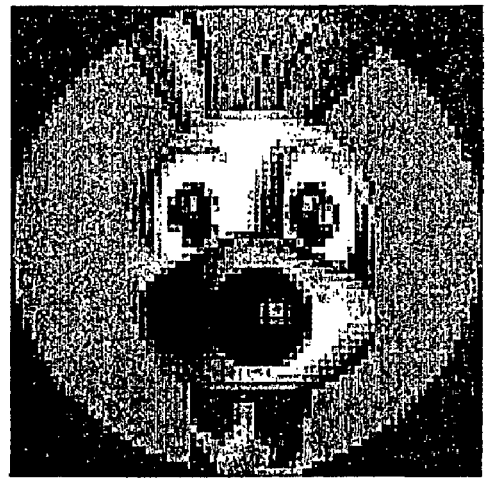
Figure 5C:
Figure 5D:
Figure 5E:
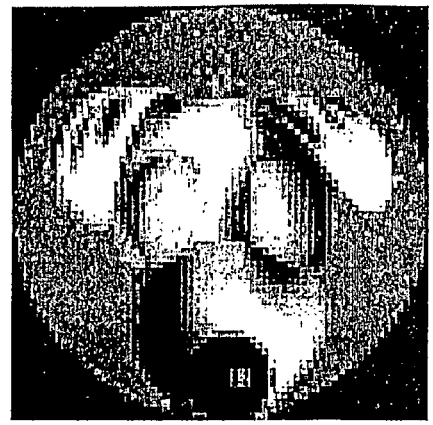

FIGS. 5a-5f illustrate various visual representations of expressions on a dog's head. In FIG. 5a, the expression of the head is that of general attention. In FIG. 5b, the expression of the head is that of amazement: eyes open wider, mouth opens. In FIG. 5c, the expression of the head is that of dissatisfaction: one ear droops, one eye sags. In FIG. 5d, the expression of the head is that of strong discontent: both ears droop. In FIG. 5e, the expression of the head is that of disinterest: eyes close, ears droop. Now, the various moods or reactions shown in FIGS. 5a-5d have been mapped on an adult dog's head, and by themselves have been taken from an earlier Patent application . . . (PHNL 000129), assigned to the same assignee as the present invention and herein being incorporated by reference. Likewise, these moods or reactions may be mapped on the head of a younger dog shown by itself in FIGS. 4a-4c. On the other hand, these and other moods and reactions may be mapped on full-body representations of a dog in various maturity statuses shown in FIGS. 4a-4d. In addition to moods or reactions mapped on expressions or motions of the head, various other part of the dogs body could express such mood or reaction. Various examples thereof would include wagging of the tail (positive), lifting rear leg (dissatisfied), lifting front paw (apprehensive), raising hairs (negative), or even yelping (of a puppy) or barking (of a grown dog-affirmative).

Next, FIG. 5f illustrates a screen format embodiment, in this case combining the dog's head with a time bar that may show the phrase that must be trained, or the actual recognition thereof.

FIGS. 6a-6d illustrate various further representation embodiments of the animated creature for the present invention. First, FIG. 5a shows the creature in the form of a Ladybird insect. The ladybird is understood to grow more and more black dots on its scarlet shields while developing to a fully mature status. In the Figure, the insect still has only two black dots out of a possible total of six. This is understood to represent a rather lowly developed training level. The insect may react to the correct recognition of voiced commands by featuring phenomena such as dancing around, getting a bright red glow, flashing its dots, or by swaying its antennae in a particular manner.

Figure 6A:
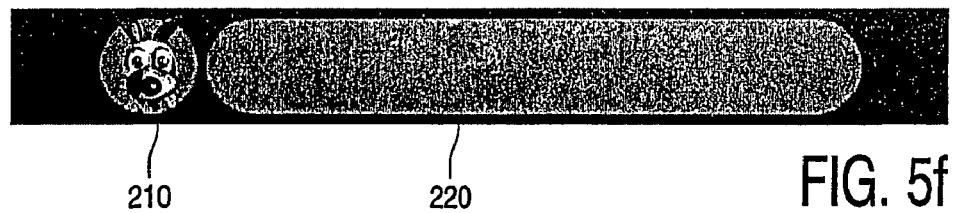
FIGS. 6a-6d, various further representation embodiments for the present invention.
Figure 6A:
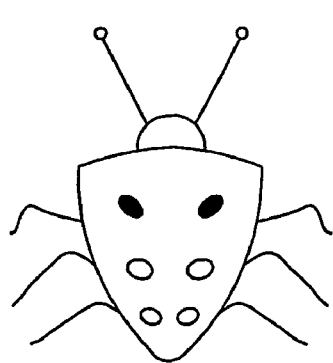
Figure 6B:
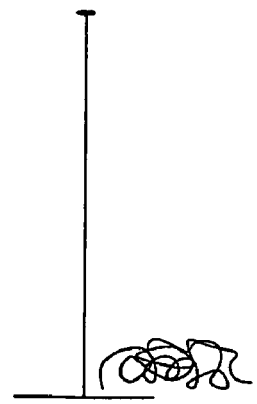
Figure 6C:
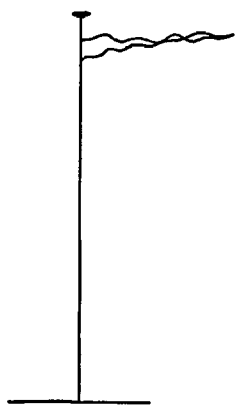
Figure 6D:

In FIGS. 6b through 6d, the animated creature is a flagpole. The training level in FIG. 6d is low, as being represented by the flag lying as a heap at the foot of the pole. In FIG. 6c, the level is intermediate as indicated in that the flag has the size of only a pennant. In FIG. 6d the training is complete, as being shown by a full-blown flag flying about in a gale. Of course, various intermediate training levels could be indicated. The flag may react to the correct recognition of voiced commands by a changed color, by enhanced waving, and the like. Various other types of animated creatures would be recognized by the skilled art worker from reading the above disclosure.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method for training a consumer-oriented application device, based on a plurality of user-presented speech items, whilst having the device reporting on a progress measure regarding a training level that has been reached for a particular user person, said method being characterized by visually representing on a display said training level by an animated character creature which has a plurality of status representative maturity statuses that are each associated to a respective user training level.

2. A method as claimed in claim 1, wherein said creature represents a living being.

3. A method as claimed in claim 1, wherein said creature represents an animal.

4. A method as claimed in claim 3, wherein said animal is a dog.

5. A method as claimed in claim 1, wherein said creature has at least three statuses.

6. A method as claimed in claim 1, wherein said statuses comprise both size and attitude aspects of said creature.

7. A methods as claimed in claim 1, wherein said statuses comprise dynamic aspects of said creature.

8. A consumer-oriented application device, said device comprising:
 a receiver which receives one of a plurality of user-presented speech items;
 a processor programmed with voice recognition software and voice recognition training software which trains a user to use the voice recognition software to achieve a plurality of user training levels;
 a visual display which visually represents the training level of the user by displaying an animated character creature that has a plurality of maturity statuses, each of the maturity statuses being associated to a corresponding one of the plurality of training levels.

9. A device as claimed in claim 8, wherein the plurality of training levels each correspond to a respective set of voice commands that the processor has been trained to recognize and respond to by executing a corresponding control function of the device.

10. A method for training a consumer oriented-application device to recognize speech of a user, comprising:
 with a display device, requesting the user to input at least one of a number of speech items to train the user;
 storing each user input speech item onto a storage medium readable by the consumer oriented-application device in a memory;
 on the display device, displaying a progress measure based on a training level achieved by the user, the training level being determined by at least one of a sophistication or number of user input speech items stored; and wherein the progress measure is represented by an animated creature character having a plurality of maturity statuses, each maturity status being associated with the progress measure.

11. The method according to claim 10, wherein the consumer oriented-application device recognizes speech from a plurality of users, the method further including:
 identifying the user by voice recognition.

12. The method according to claim 10, wherein each speech item is associated to a command for controlling a consumer oriented device, the method further including:
 controlling a functionality of the consumer oriented-application device in accordance with the command associated with a user input speech item.

13. The method according to claim 10, further including:
 in response to successful completing of a training level, changing an attitude aspect of the animated creature to express approval.

14. The method according to claim 10, further including:
 in response to unsuccessful completing of a training level, changing an attitude aspect of the animated creature to express disapproval.

15. The method according to claim 10, wherein as the user's training level improves, an age maturity of the animated creature increases.

16. The method according to claim 10, further including:
 determining if an input speech item is inconclusive; and
 requesting the user to input the inconclusive speech item again.

17. The method according to claim 10, wherein the animated creature character has at least three maturity statuses.

18. A voice controlled consumer device comprising:
 a speech channel which receives user-presented speech items:
 a computer readable memory;
 a video display;
 a processor programmed to perform voice recognition and training including:
 during training:
 requesting the user to input speech items, storing the speech items on the computer readable memory,
 determining a training level of the user from the input speech items,
 controlling the video display to display an animated creature with a maturity status corresponding to the determined training level,
 after training:
 controlling functionality of the consumer device in response to the received speech items.

19. The voice controlled consumer device according to claim 18, wherein a plurality of training levels exists, each training level being associated to a respective set of operative commands that are presented to control the functionality of the consumer oriented-application device.

20. The voice controlled consumer device according to claim 18, wherein the processor is programmed to:
 in response to successfully completing of a training level, changing an attitude aspect of the animated creature to express approval; and
 in response to unsuccessfully completing of a training level, changing an attitude aspect of the animated creature to express disapproval.

* * * * *